(12) United States Patent
Takiguchi

(10) Patent No.: US 7,252,233 B2
(45) Date of Patent: Aug. 7, 2007

(54) IMAGE READING APPARATUS AND A CONTROL METHOD FOR AN IMAGE READING APPARATUS

(75) Inventor: Yuji Takiguchi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 533 days.

(21) Appl. No.: 10/858,712

(22) Filed: Jun. 1, 2004

(65) Prior Publication Data

US 2005/0168523 A1     Aug. 4, 2005

(30) Foreign Application Priority Data

Jun. 5, 2003 (JP) .............................. 2003-160845

(51) Int. Cl.
*G06K 7/10* (2006.01)
(52) U.S. Cl. ...................... 235/454; 235/475
(58) Field of Classification Search ................ 235/380, 235/375, 454, 475, 477, 479, 480; 358/474, 358/504

See application file for complete search history.

(56) References Cited

U.S. PATENT DOCUMENTS 4,827,350 A * 5/1989 Kobayashi et al. ......... 358/494
6,349,879 B1 2/2002 Watanabe et al.
6,443,645 B1 9/2002 Takei et al.
6,520,413 B2 2/2003 Watanabe et al.
2002/0039207 A1 * 4/2002 Kanda ......................... 358/498
2002/0056752 A1 5/2002 Watanabe et al.
2003/0063332 A1 * 4/2003 Sato ............................ 358/474

FOREIGN PATENT DOCUMENTS

| JP | 2000-222643 | 8/2000 |
| JP | 2001-334729 | 12/2001 |
| JP | 2001-341369 | 12/2001 |
| JP | 2003110807 | 4/2003 |

* cited by examiner

*Primary Examiner*—Karl D. Frech

(57) ABSTRACT

An image reading apparatus having an image sensor for slips and an image sensor for card-type media is configured to switch operation between the two image sensors quickly and efficiently. The slip image sensor reads slips conveyed through a first transportation path to acquire image data from the slips. The card-type image sensor reads cards conveyed through a second transportation path to acquire image data from the cards. An active device selector selects, according to a change active scanner (change operation) command sent from a host computer, one or the other of the image sensors as the active image sensor to be driven. These control operations are also embodied in a control method for such an image reading apparatus.

6 Claims, 12 Drawing Sheets

IMAGE READING APPARATUS AND A CONTROL METHOD FOR AN IMAGE READING APPARATUS

BACKGROUND OF THE INVENTION

1. Field of the Invention

The present invention relates to an image reading apparatus and control method for such apparatus, and relates more particularly to an image reading apparatus having two or more image sensors and to a method for controlling operations of the sensors in such an apparatus.

2. Description of the Related Art

Continuous forms printers that print receipts and tickets on roll paper or continuous form paper and slip (cut-sheet) printers that print on personal checks and other types of checks are widely used. Such printers include hybrid printers in which a single printing apparatus has both a print function for printing continuous forms (roll paper) and a print function for printing slips.

A hybrid printer of this type is shown in FIG. 12. The hybrid printer 310 has an opening 321 formed in the top of the case 320 for loading roll paper P, and an internal compartment 322 for holding the roll paper P. The roll paper P is held so that it can rotate freely inside the compartment 322. The leading end of the roll paper P is pulled out from the front inside the case 320 through a transportation path 323 that is formed when the cover 330 is closed. A thermal print head 324 is located on this transportation path 323 for printing on the roll paper P.

The cover 330 opens and closes the loading opening 321, at the top front of which is a slip loading surface 331 for inserting slips. A slip guide 332 is formed along the direction of slip S insertion on one side of the slip loading surface 331. When the cover 330 is closed, an opening 325, which acts as an exit for roll paper P, is formed by the gap between the case 320 and the end of the cover 330 at a position lower than the slip loading surface 331. A slip printing unit 360 is further disposed at the top back side of the cover 330. See, for example, Japanese Unexamined Patent Publication (kokai) 2001-341369, page 5 and FIG. 2.

Image scanners for capturing images of checks and other slip forms, or personal identification presented for verification, such as driver licenses, credit cards with photographic ID, and other photo IDs, are sometimes installed for use in conjunction with hybrid printers such as described above. Hybrid printers having a built-in image scanner are also increasingly common.

Because media thickness varies greatly between such personal identification as driver licenses and other photo IDs and slips such as checks, it is difficult to scan both types of media with a single image sensor. As a result, two image sensors must be provided in a single hybrid printer in order to process two different types of media such as thick personal identification and much thinner slips.

However, conventional devices with multiple image sensors require an initialization operation including sending configuration signals that must be executed every time the scanner to be used changes. A certain amount of setup time is therefore required by this initialization operation in this type of apparatus, and switching between the scanners becomes time-consuming.

OBJECTS OF THE INVENTION

An object of the present invention is therefore to provide an image reading apparatus having an image sensor for one type of media (e.g., slips) and an image sensor for another type of media (e.g., card-type media), wherein the image reading apparatus can switch operation between the two image sensors quickly and efficiently.

A further object is to provide a method for controlling operation of the image sensors of such an image reading apparatus.

SUMMARY OF THE INVENTION

Accordingly, in one aspect of the invention, a control method is provided for controlling an image reading apparatus having a first image sensor that reads a first medium conveyed on a first transportation path and captures image data from the first medium, and a second image sensor that reads a second medium conveyed on a second transportation path and captures image data from the second medium. The method comprises the steps of: receiving a change operation command from a host computer; and selecting, according to this change operation command, either the first image sensor or second image sensor as the active image sensor to be driven.

In another embodiment of the control method, a first command is received that selects either the first or second image sensor as the image sensor to be configured. A second command for changing the settings of the to-be-configured image sensor is then received. The second command does not specify for which image sensor the settings are to be changed. Preferably, the first command identifies the selected image sensor and places it in a state in which its configuration settings can be changed.

In accordance with another aspect of the present invention, an image reading apparatus is provided. The apparatus has separate transportation paths for two different media, and a separate image sensor for imaging each type of media. An active device selector selects, according to a change operation command sent from a host computer, one or the other of the two image sensors as the active sensor to be driven to read and image the corresponding media.

In a another embodiment, the apparatus may be configured to include an image sensor that reads a first medium conveyed through a first transportation path to acquire data from the first medium and also reads a second medium conveyed through a second transportation path to acquire data from the second medium. The image sensor may be disposed in common portion of the two transportation paths. An active device selector selects, according to a change operation command sent from a host computer, the first or second medium to be read and imaged.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A preferred embodiment of an image reading apparatus according to the present invention is described below with reference to the accompanying figures.

Figure 1:
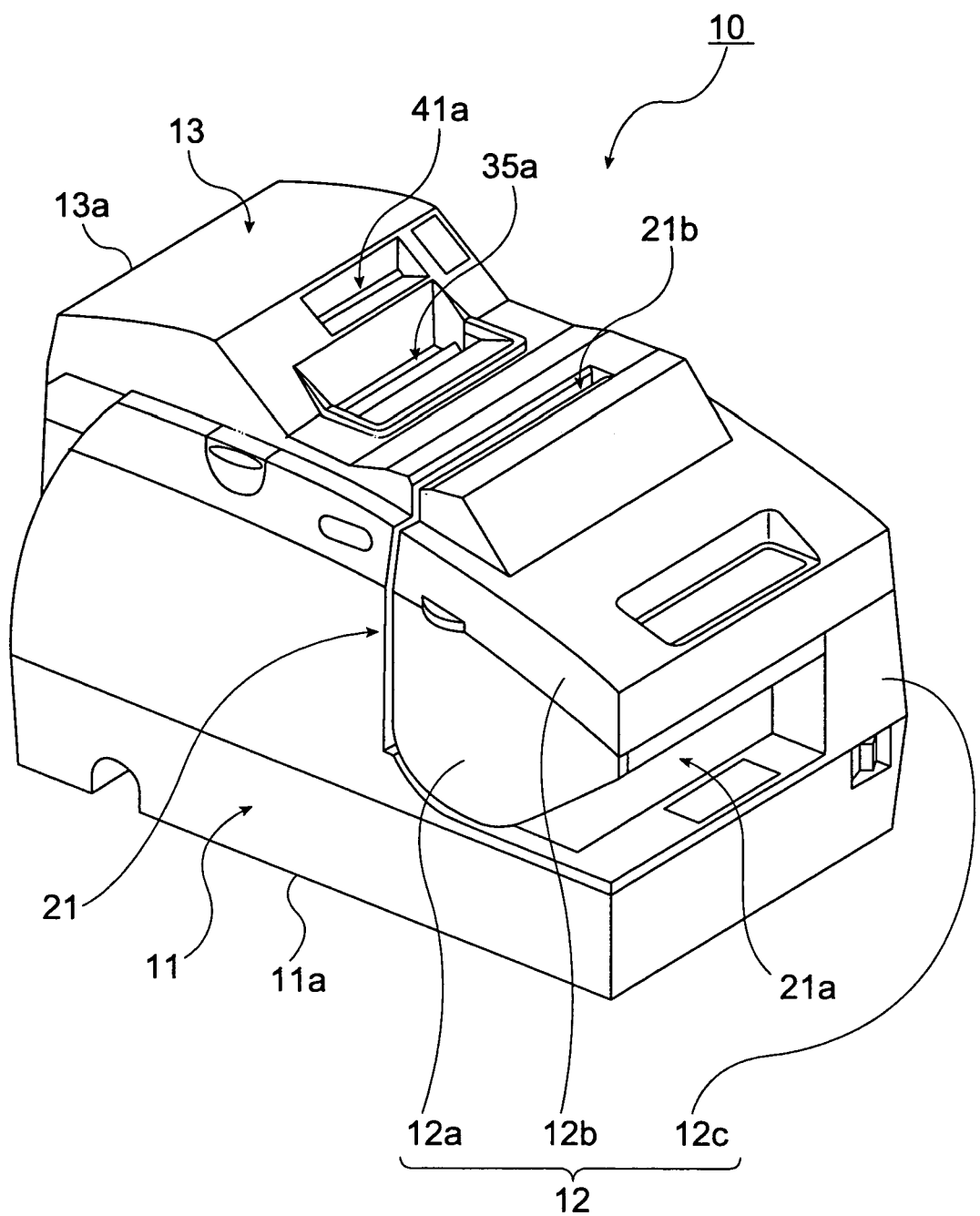
FIG. 1 is an external oblique view showing a printer having an image scanner according to a preferred embodiment of the present invention.
Figure 2:
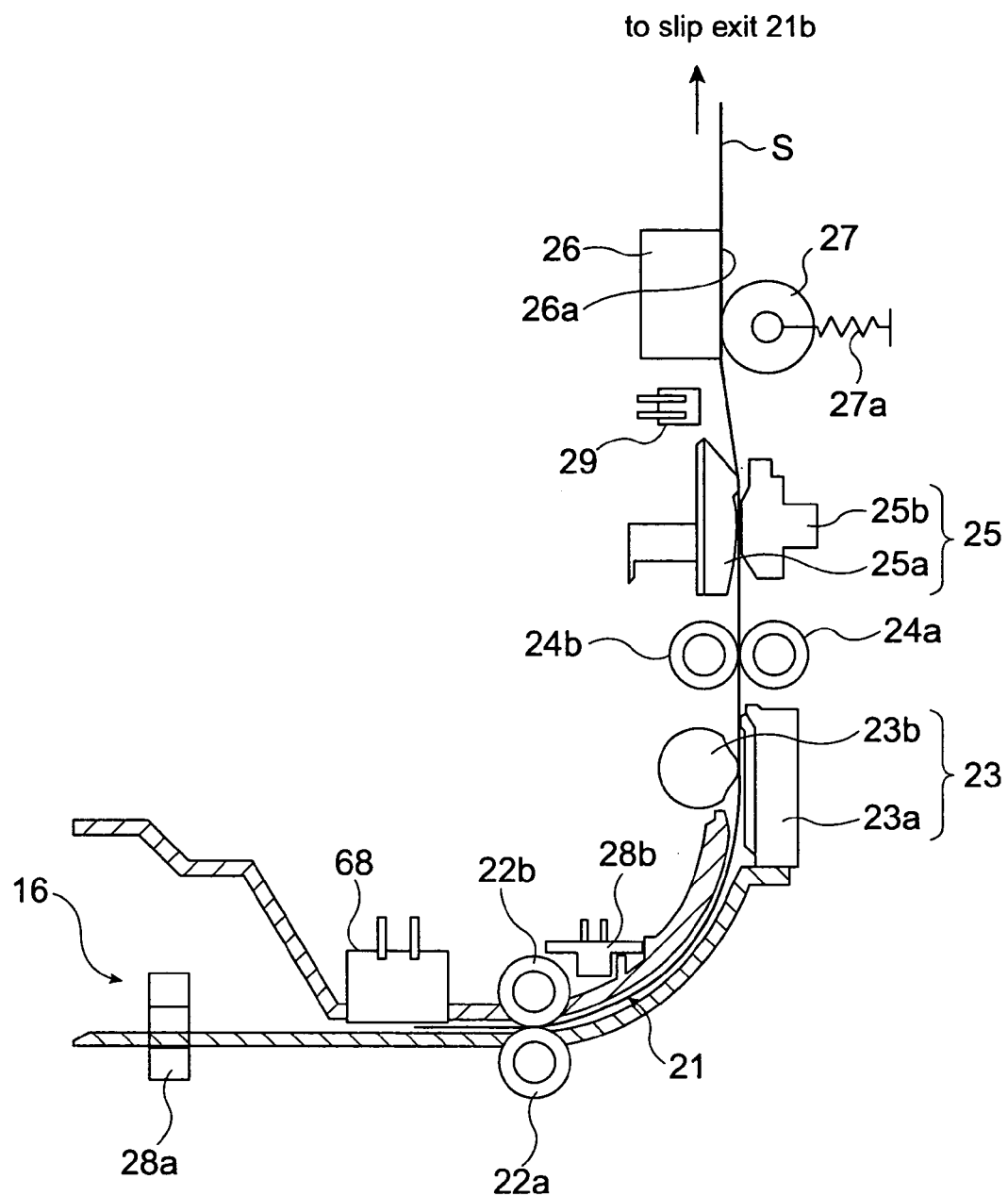
FIG. 2 is a schematic view showing the major components of the slip transportation path of the image-scanner-equipped printer.
Figure 3:
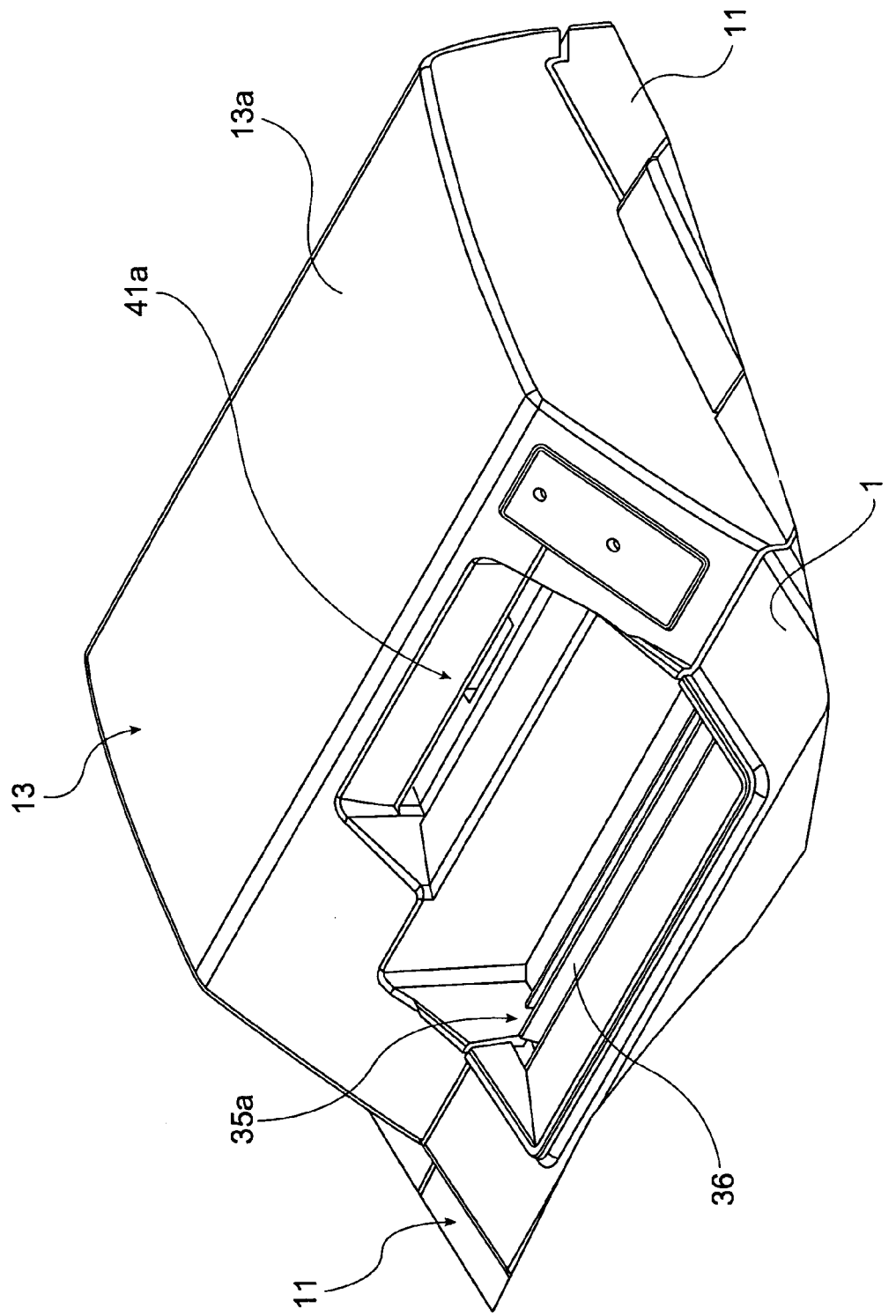
FIG. 3 is an oblique view showing the top cover of the image-scanner-equipped printer.
Figure 4:
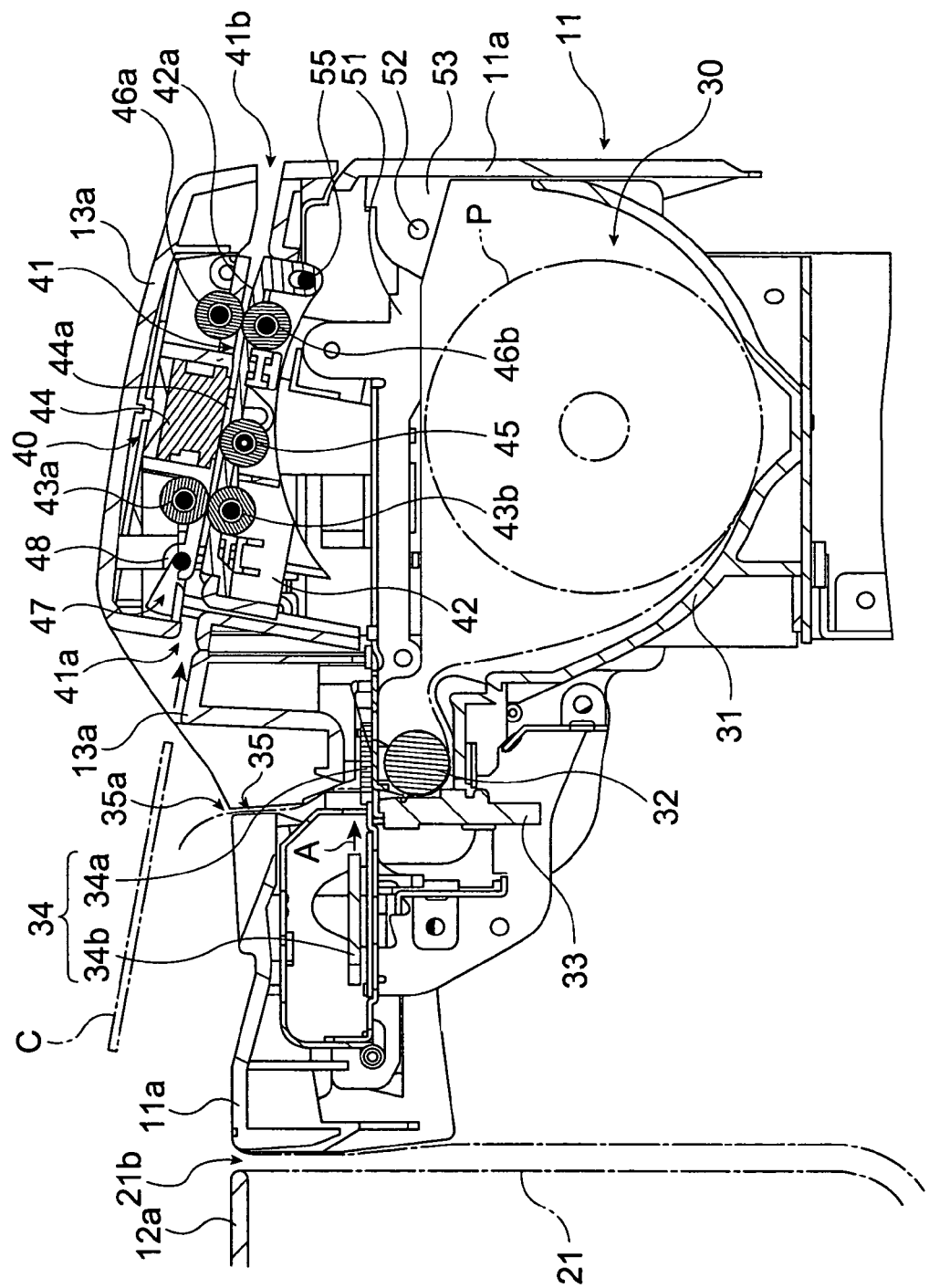
FIG. 4 is a partial section view of the image-scanner-equipped printer.

FIG. 1 is an external oblique view showing a printer equipped with an image scanner, generally referred to by the reference numeral 10 and constructed according to a preferred embodiment of the present invention. FIG. 2 is a schematic view showing the major components of the slip transportation path. FIG. 3 is an oblique view showing the top cover of this printer having an image scanner. FIG. 4 is a partial section view of this printer having an image scanner.

Printer equipped with image scanner 10 according to this embodiment of the invention can print on both roll paper P (see FIG. 4) and slips S (see FIG. 2), and can image both slips S and cards C (see FIG. 4). Printer equipped with image scanner 10 is therefore a hybrid printer having a printer for printing on slips S and roll paper P, and having an image scanner for capturing images of both slips S and cards C.

Printer equipped with image scanner 10 (referred to below as "hybrid printer 10") has a bottom cover unit 11, front cover unit 12, and top cover unit 13. The bottom cover unit 11 holds roll paper P as the continuous form medium inside housing 11a, and contains a print mechanism for printing on roll paper P. The front cover unit 12 is disposed at the front of the bottom cover unit 11. A slip transportation path 21 is formed between the front cover unit 12 and bottom cover unit 11 for conveying slips S. The top cover unit 13 is assembled to cover the top of the bottom cover unit 11, and houses a card scanner for reading image information recorded to card type media.

The front cover unit 12 is composed of a front bottom part 12a separated from the bottom cover unit 11 with the slip transportation path 21 therebetween, a front cover 12b part covering the top of the front bottom part 12a, and a front side part 12c for supporting the front bottom part 12a and front cover 12b in a cantilevered manner. As shown in FIG. 1 and FIG. 2, slips S can be inserted from the slip insertion slot 21a located at the front of the hybrid printer 10 between the housing 11a of bottom cover unit 11 and the front bottom part 12a of front cover unit 12.

As shown in FIG. 2, a slip S inserted into the slip transportation path 21 is conveyed to the downstream endorsement printing unit 23 by subslip feed roller 22a and subslip pressure roller 22b, which is disposed opposite the subslip feed roller 22a with the slip transportation path 21 therebetween.

The endorsement printing unit 23 is composed of a serial impact dot matrix print head 23a disposed to the back side of the slip S, and a platen 23b, which is disposed opposite the print head 23a with the slip transportation path 21 therebetween. This print head 23a can print on the back of the slip S.

A slip S conveyed further downstream from the endorsement printing unit 23 is carried to the front printing unit 25 in the slip transportation path 21 by means of slip transportation roller 24a and subslip pressure roller 24b, which is disposed opposite the slip transportation roller 24a with the slip transportation path 21 therebetween.

The front printing unit 25 is composed of a serial impact dot matrix print head 25a disposed to the front (face) of the slip S, and a platen 25b disposed opposite the print head 25a with the slip transportation path 21 therebetween. This print head 25a can print on the front of the slip S. As the slip S is then conveyed further downstream from the front printing unit 25, the slip S passes slip image sensor 26.

The slip image sensor 26 is a contact image sensor (CIS) scanner, and is disposed to the front (face) side of the slip S. A pressure roller 27 is disposed opposite the slip image sensor 26 with the slip transportation path 21 therebetween. The pressure roller 27 presses the slip S to the scanning surface 26a of the slip image sensor 26 with specific pressure appropriate to the slip thickness by means of urging mechanism 27a. The slip image sensor 26 reads image information recorded on the face of the slip S one line at a time with the slip S pressed to the scanning surface 26a by means of pressure roller 27. After the slip S passes between the slip image sensor 26 and pressure roller 27, the slip S is discharged from slip exit 21b.

A slip trailing-edge sensor 28a is also disposed near the slip insertion slot 21a, and a slip leading-edge sensor 28b is disposed downstream from the subslip pressure roller 22b, for detecting the presence of a slip S in the slip transportation path 21, and for controlling slip indexing for printing by the front printing unit 25 and endorsement printing unit 23.

A discharge detector 29 is disposed between the front printing unit 25 and slip image sensor 26 for detecting whether the slip S has been discharged from the slip transportation path 21.

An MICR sensor 68 is also disposed near the slip insertion slot 21a of the slip transportation path 21. This MICR sensor 68 is for reading MICR text printed in magnetic ink on checks S, for example. In the case of checks, for example, this MICR text typically contains tracking information such as a unique number identifying the bank on which the check is drawn, the bank branch, the account number, and the serial number of the check. The hybrid printer 10 recognizes the MICR data on an inserted check by reading the MICR text using this MICR sensor 68.

The slip transportation path 21 and operations executed along the slip transportation path 21 are described above.

The roll paper transportation path 35 and components disposed along that path are described next with reference to FIG. 4 and FIG. 5. The roll paper transportation path 35 is formed between the bottom cover unit 11 and top cover unit 13. The roll paper P is stored in roll paper housing 30 formed by roll housing wall 31 rendered inside the bottom cover unit 11. The roll paper P is delivered from the roll along the roll paper transportation path 35, and is discharged from the roll paper exit 35a formed between the housing 11a and top cover 13a.

This roll paper housing 30 is a drop-in type roll paper housing. The roll paper P is simply placed inside the roll paper housing 30 where it is supported by the roll housing wall 31. Paper is supplied from the roll P guided by the roll housing wall 31 as the roll rotates thereon. The free end of the roll paper P disposed inside the roll paper housing 30 is pulled from the roll paper housing 30 and passed between the platen roller 32 and thermal print head 33.

Figure 5:
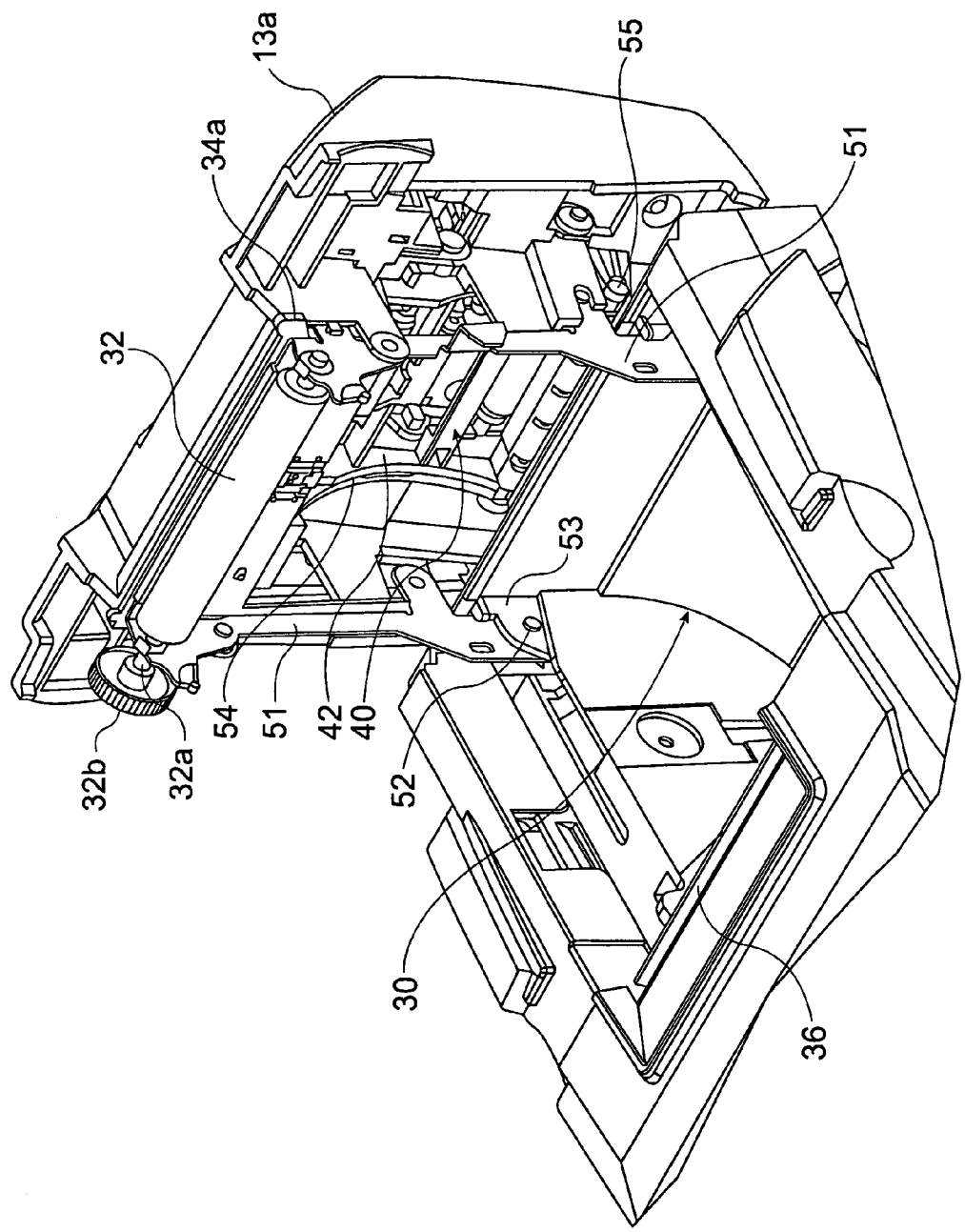
FIG. 5 is an oblique view showing the internal configuration the image-scanner-equipped printer.

As shown in FIG. 5, the platen roller 32 is rotatably supported on the frame 51 of the top cover unit 13 by a rotating shaft 32a. The platen roller 32 is rotationally driven by a motor not shown via a gear 32b assembled to an end of the rotating shaft 32a, and thereby feeds the roll paper P.

The thermal print head 33 is configured for printing text to the roll paper P delivered by the platen roller 32. The printed roll paper P then passes through the roll paper transportation path 35 and is discharged from roll paper exit 35a.

An automatic paper cutter 34 is disposed above the platen roller 32 and thermal print head 33 as shown in FIG. 4. This auto-cutter 34 is composed of a fixed blade 34a located on one side of the roll paper transportation path 35, and a movable blade 34b located on one side of the fixed blade 34a with the roll paper transportation path 35 therebetween. As shown in FIG. 5, the fixed blade 34a is supported by frame 51 of top cover unit 13 at a position adjacent to the platen roller 32. The movable blade 34b is configured movably in the direction of arrow A (FIG. 4) towards the roll paper transportation path 35 so that it can cut the roll paper P located between the movable blade 34b and fixed blade 34a.

A fixed roll paper cutting blade 36 is also rendered lengthwise to and near the roll paper exit 35a as shown in FIG. 3. This roll paper cutting blade 36 is used to manually cut the roll paper P. It should be noted that both an auto-cutter 34 and a manual roll paper cutting blade 36 are provided for cutting roll paper P in this embodiment of the invention, but it is also possible to provide only one of these.

As shown in FIG. 5, a main support frame 51 is located at the bottom of the top cover unit 13. This frame 51 pivots on a hinge 52 relative to fixed frame 53 rendered to the bottom cover unit 11 so that the top cover unit 13 can open and close to the roll paper housing 30. To replace the roll paper P, the top cover unit 13 pivots open on hinge 52 so that the roll paper P can be loaded into the roll paper housing 30.

The card image reader 40 is described next with reference to FIG. 3 and FIG. 4. The card image reader 40 is assembled between the top cover 13a and roll paper housing 30. Thick media such as cards C are inserted into the card insertion opening 41a to the card transportation path 41 for reading image information on the card C by the card image reader 40.

A first feed roller 43a, card image sensor 44, and second feed roller 46a are disposed along the top side of the card transportation path 41, that is, on the top cover 13a side, in the card image reader 40.

A first pressure roller 43b, pressure roller 45, and second pressure roller 46b are disposed on the bottom side of the card transportation path 41, that is, on the roll paper housing 30 side, at positions respectively opposite the first feed roller 43a, card image sensor 44, and second feed roller 46a.

The first feed roller 43a and first pressure roller 43b are located between the card insertion opening 41a and card image sensor 44, that is, upstream of the card image sensor 44, and are configured so that a card C inserted to the card transportation path 41 can be conveyed forward and reverse along the card transportation path 41. A card C conveyed by the first feed roller 43a and first pressure roller 43b is fed between the card image sensor 44 and pressure roller 45.

The card image sensor 44 is a CIS scanner for reading text and images from the card surface. The card image sensor 44 reads image information including text and graphics one line at a time from a card C with the card pressed to the scanning surface 44a of the card image sensor 44 with pressure appropriate to the card thickness by means of the pressure roller 45.

The second feed roller 46a and second pressure roller 46b are located downstream from the card image sensor 44, and are configured so that they can convey a card C inserted into the card transportation path 41 in both forward and reverse directions through the card transportation path 41.

An overhang opening 41b is formed downstream from the second feed roller 46a and second pressure roller 46b at a position intersecting the card transportation path 41 and top cover 13a. This overhang opening 41b allows a card C in the card transportation path 41 to be fed to the downstream side of the card transportation path 41 so that it temporarily overhangs to the outside from the back of the hybrid printer 10 while still nipped between the second feed roller 46a and second pressure roller 46b.

During the actual scanning operation, a card C is inserted from the card insertion opening 41a shown in FIG. 3 and FIG. 4, conveyed from the card insertion opening 41a toward the overhang opening 41b by means of the first feed roller 43a and first pressure roller 43b pair, and the second feed roller 46a and second pressure roller 46b pair, until the card C reaches a position completely beyond the card image sensor 44. The first feed roller 43a and second feed roller 46a are then reversed to carry the card C back to the card insertion opening 41a side. As the card C then passes over the scanning surface 44a of card image sensor 44, text and image information on the card C surface is read by the card image sensor 44. After scanning is completed, the card C is discharged from the card insertion opening 41a externally to the hybrid printer 10.

Having described the construction of a printer equipped with an image scanner 10 above, control of this hybrid printer 10 according to the present invention is described next with reference to FIGS. 6 to 11.

Figure 6:
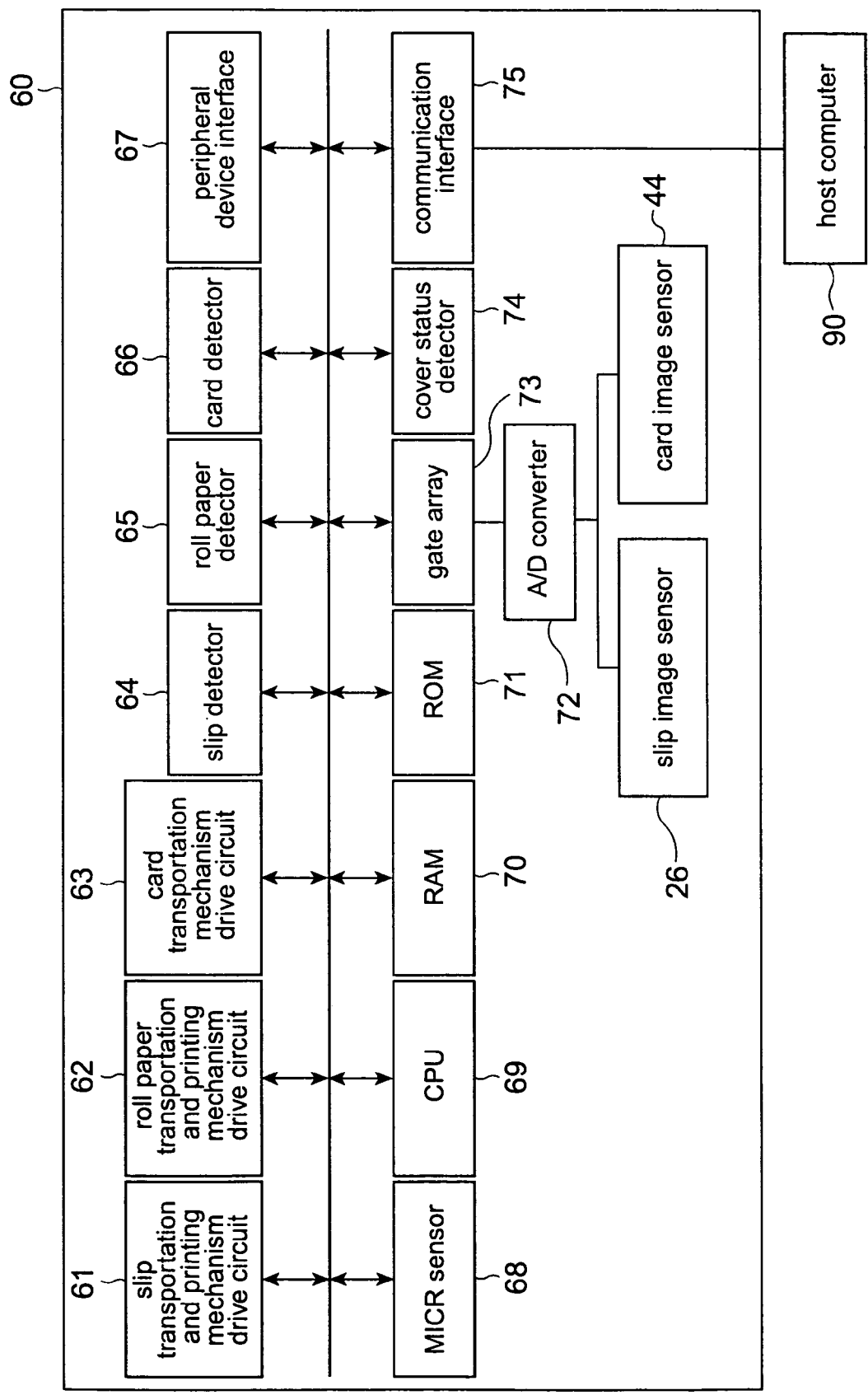
FIG. 6 is a block diagram showing the circuit configuration of the image-scanner-equipped printer.
Figure 7:
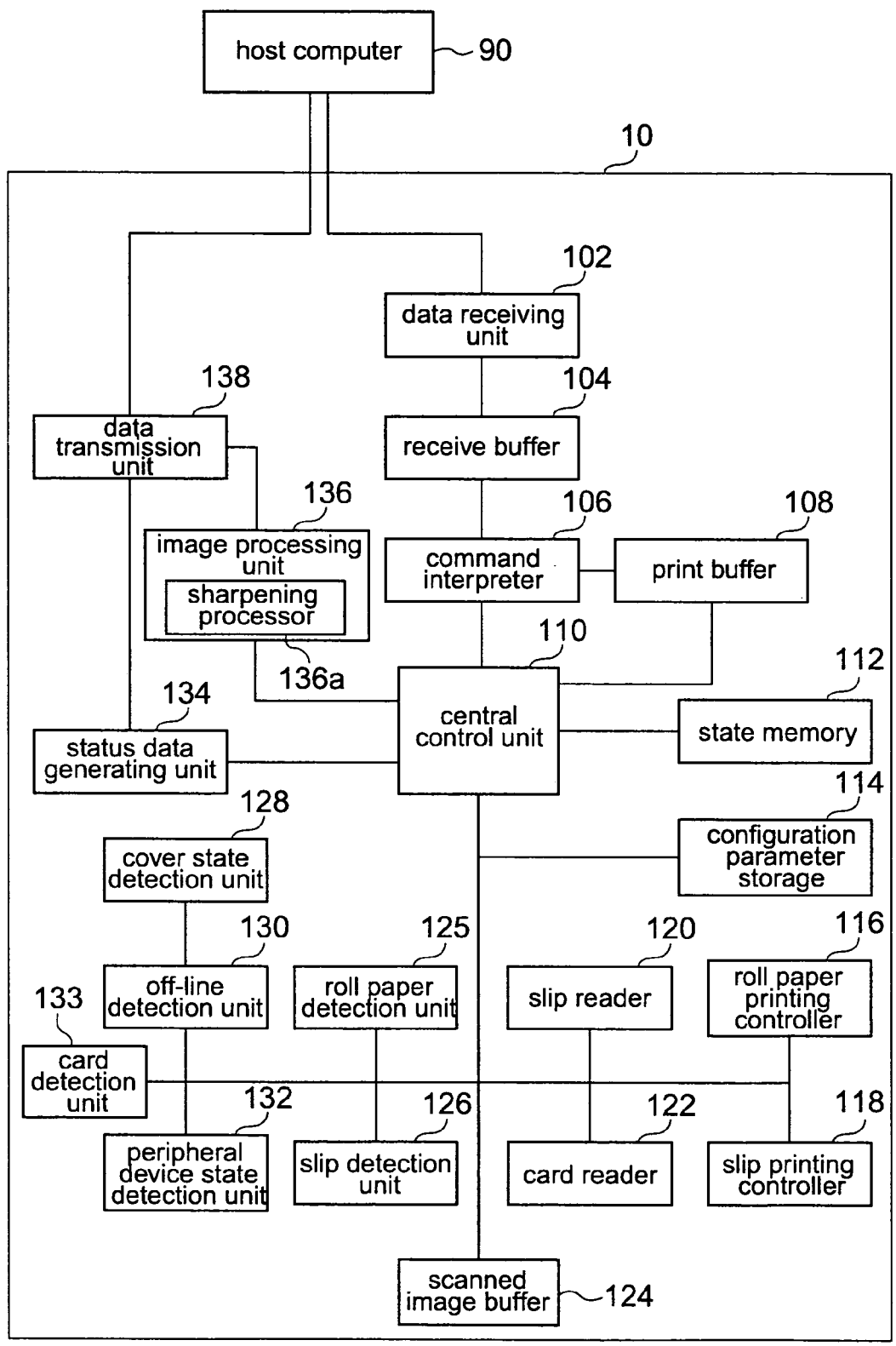
FIG. 7 is a functional block diagram showing the overall configuration of the functional part controlling the image-scanner-equipped printer.
Figure 8:
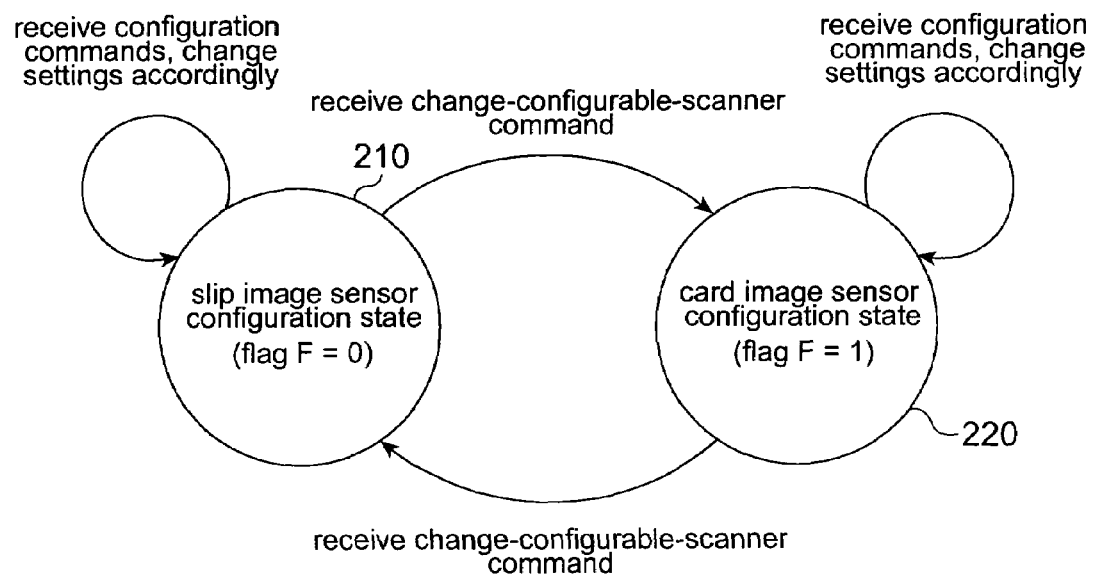
FIG. 8 is a state transition diagram showing the internal states and transition conditions of the image-scanner-equipped printer.
Figure 9:
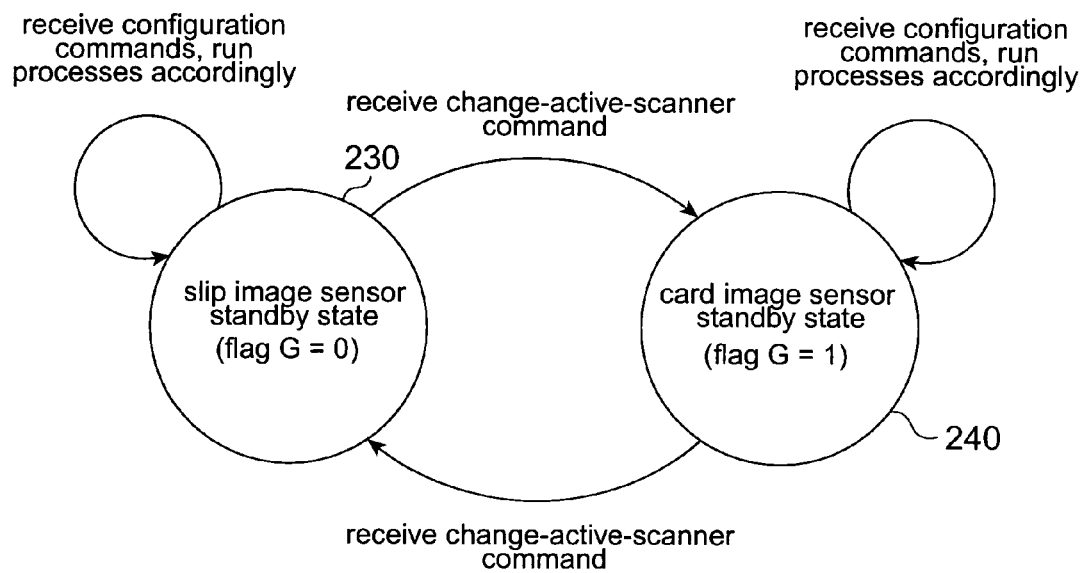
FIG. 9 is a state transition diagram showing the internal states and transition conditions of the image-scanner-equipped printer.

FIG. 6 is a schematic block diagram of the circuits 60 of a hybrid printer 10 according to this preferred embodiment of the invention. FIG. 7 is a functional block diagram showing the overall configuration of the functional part controlling this printer having an image scanner 10, and FIGS. 8 and 9 are state transition diagrams showing the internal states and state transition conditions of this hybrid printer.

These circuits 60 include a slip transportation and printing mechanism drive circuit 61, roll paper transportation and printing mechanism drive circuit 62, card transportation mechanism drive circuit 63, slip detector 64, roll paper detector 65, card detector 66, peripheral device interface 67, MICR sensor 68, CPU 69, RAM 70, ROM 71, gate array 73 connected through an A/D converter 72 to slip image sensor 26 and card image sensor 44, a cover status detector 74, and a communication interface 75 interconnected via an internal data communications bus 80.

The CPU 69 of these circuits 60 runs a control program, which may be stored as firmware in ROM 71, to read data from and write data to RAM 70 while controlling driving circuit components according to commands sent from a host computer 90 and the detector states received from various sensors. The operation of these members is described briefly below while omitting further description of the components already mentioned in the above description of the hybrid printer 10.

The slip transportation and printing mechanism drive circuit 61 is a drive control circuit for driving the subslip feed roller 22a and slip transportation roller 24a shown in FIG. 2 to convey a slip S through the slip transportation path 21. The slip transportation and printing mechanism drive circuit 61 also controls the print head 23a of endorsement printing unit 23, the print head 25a of front printing unit 25, or both, to print as required on the back, front, or both sides of the slip S.

The roll paper transportation and printing mechanism drive circuit 62 is a drive control circuit for driving the platen roller 32 shown in FIG. 4 and FIG. 5 to convey the roll paper P through roll paper transportation path 35 while driving and controlling the thermal print head 33 to print on the roll paper P. The roll paper transportation and printing mechanism drive circuit 62 also drives the movable blade 34b of auto-cutter 34 to cut the roll paper P at a desired position while driving the platen roller 32.

The card transportation mechanism drive circuit 63 is a drive control circuit for driving the first feed roller 43a and second feed roller 46a to convey a card C inserted from the card insertion opening 41a forward and reverse through the card transportation path 41. More specifically, the card transportation mechanism drive circuit 63 sequentially drives the first feed roller 43a and second feed roller 46a to convey the card C from the card insertion opening 41a to the overhang opening 41b, and then reverses driving the first feed roller 43a and second feed roller 46a to carry the card C back to the card insertion opening 41a side.

The slip detector 64 is composed of slip trailing-edge sensor 28a, slip leading-edge sensor 28b, and discharge detector 29, and detects the presence and position of a slip S conveyed through the slip transportation path 21.

The roll paper detector 65 and card detector 66 respectively detect roll paper P and cards C traveling through roll paper transportation path 35 and card transportation path 41 to detect the presence and position of the roll paper P and card C.

The peripheral device interface 67 is an interface enabling communication with a cash drawer and other peripheral devices connected to the hybrid printer 10.

The A/D converter 72 digitizes and outputs the output signals from the slip image sensor 26 and the card image sensor 44. Output from the A/D converter 72 is applied to the gate array 73, which is a buffer for temporarily storing output from the A/D converter 72. The gate array 73 has a two-line buffer capacity for storing data captured by the slip image sensor 26 and the card image sensor 44. The gate array 73 buffers the output signals from the slip image sensor 26 or card image sensor 44 one line at a time, and outputs the buffered output signals one line at a time to RAM 70.

The cover status detector 74 is a sensor for detecting whether the front cover 12b or the top cover 13a of the hybrid printer 10 is open or closed. If the cover status detector 74 detects that the front cover 12b or top cover 13a is open, the hybrid printer 10 goes off line, and processing commands from the host computer 90 is logically interrupted.

The communication interface 75 is an interface for communication with the host computer 90. The communication interface 75 and host computer 90 are connected via a USB, parallel, RS-232C, or other connection.

Overall control of a hybrid printer 10 according to this embodiment of the invention is described next with reference to FIG. 7. The functional units shown in FIG. 7 are achieved in this embodiment of the invention by the CPU 69 executing firmware written to ROM 71 in the circuits 60 shown in FIG. 6.

The host computer 90 outputs control commands for controlling the hybrid printer 10, and converts the print data to be printed to print commands output to the hybrid printer 10. The hybrid printer 10 is controlled by the commands sent from the host computer 90, and based on these commands executes processes to change internal printing and scanning settings, as well as printing and scanning operations.

The data receiving unit 102 receives commands and print data from the host computer 90 through communication interface 75. The control commands and print data received by the data receiving unit 102 are temporarily stored in a receive buffer 104 reserved in RAM 70. The control commands and print data stored in receive buffer 104 are then passed to command interpreter 106.

The command interpreter 106 interprets the received signals. If a received signal is a control command, the command interpreter 106 interprets the command and passes the control command content to the central control unit 110. If the received signal is print data, the command interpreter 106 temporarily stores the print data to a print buffer 108 reserved in RAM 70.

The central control unit 110 is a controller for the execution of control operations performed by various control functional units according to the control commands interpreted by the command interpreter 106. More specifically, the control function units of the hybrid printer 10 execute specific processes according to commands from the central control unit 110.

The state memory 112 is a storage area for storing hybrid printer 10 states. This state memory 112 can be achieved using flags stored in specific areas of RAM 70. The central control unit 110 checks the state of these flags in state memory 112 and runs control operations accordingly. More specifically, this state memory 112 stores a flag F denoting the image sensor for which settings can be changed, and a flag G denoting the active image sensor.

Flag F indicates whether the settings of the slip image sensor 26, or the settings of the card image sensor 44, can be changed at the current point in time. As shown in FIG. 8, the state memory 112 has two states, a slip image sensor configuration state 210 (when flag F=0) in which settings for the slip image sensor 26 can be accepted and changed, and a card image sensor configuration state 220 (when flag F=1) in which settings for the card image sensor 44 can be accepted and changed.

Parameters relating to the slip image sensor 26 can be set when in the slip image sensor configuration state 210. If the hybrid printer 10 receives an image sensor configuration command from the host computer 90 when in the slip image sensor configuration state 210, it configures the slip image sensor 26 according to the received image sensor configuration command, and rewrites the slip image sensor 26 settings stored in configuration parameter storage 114. Parameters relating to the card image sensor 44 cannot be changed when in the slip image sensor configuration state 210.

Parameters relating to the card image sensor 44 can be set when in the card image sensor configuration state 220. If the hybrid printer 10 receives an image sensor configuration command when in the card image sensor configuration state 220, it configures the card image sensor 44 according to the received image sensor configuration command, and rewrites the card image sensor 44 settings stored in configuration parameter storage 114. Parameters relating to the slip image sensor 26 cannot be changed when in the card image sensor configuration state 220.

Image sensor configuration commands that might be received from the host computer 90 in the slip image sensor configuration state 210 or card image sensor configuration state 220 include, for example, setting the basic operation of the image sensor, setting the scanning area, setting the image compression method, deleting a cropping area, setting a cropping area, and sending the settings. Setting the basic image sensor operation includes in this embodiment setting a sharpen process, un-sharpen process, and noise removal operation on/off. Of these operations, the sharpen process is described further below.

The slip image sensor configuration state 210 and card image sensor configuration state 220 are selected by receiving a change-configurable-scanner command, which is an image sensor configuration command, from the host computer 90. This change-configurable-scanner command is shown below.

$$F(32, n_1), \quad (1)$$

where 32 denotes the change-configurable-scanner command, and $n_1$ denotes the image sensor to be configured. In this embodiment, for example, if $n_1=0$, the image sensor to be configured is the slip image sensor 26, and if $n_1=1$, the image sensor to be configured is the card image sensor 44.

More specifically, if a change-configurable-scanner command setting the card image sensor 44 as the image sensor to configure (that is, $n_1=1$) is received when in the slip image sensor configuration state 210, the hybrid printer 10 changes state to the card image sensor configuration state 220. Likewise, if a change-configurable-scanner command setting the slip image sensor 26 as the image sensor to configure (that is, $n_1=0$) is received when in the card image sensor configuration state 220, the hybrid printer 10 changes state to the slip image sensor configuration state 210.

As for Flag G, it indicates whether the slip image sensor 26 or the card image sensor 44 is active. As shown in FIG. 9, the state memory 112 also stores a slip image sensor standby state 230 (when flag G=0) and a card image sensor standby state 240 (when flag G=1).

When in the slip image sensor standby state 230, the slip image sensor 26 is active and standing by. When an image sensor process command is received from the host computer 90 in this state 230, a scanning operation using the slip image sensor 26 is run according to the received image sensor process command. Scanning operations using the card image sensor 44 are not executed when in this slip image sensor standby state 230.

When in the card image sensor standby state 240, the card image sensor 44 is active and standing by. When an image sensor process command is received from the host computer 90 in this state 240, a scanning operation using the card image sensor 44 is run according to the received image sensor process command. Scanning operations using the slip image sensor 26 are not executed when in this card image sensor standby state 240.

When in the slip image sensor standby state 230 or card image sensor standby state 240, image sensor process commands receivable from the host computer 90 include, for example, send status, scan and return result, pre-scan, wait for media insertion, and end processing commands.

The slip image sensor standby state 230 and card image sensor standby state 240 can be switched by receiving a change-active-scanner command (also referred to as a change operation command herein), which is an image sensor process command, from the host computer 90. This change-active-scanner command is shown below.

$$G(80, n_2), \quad (2)$$

where 80 denotes the change-active-scanner command, and $n_2$ denotes the image sensor to be made active. In this embodiment, for example, if $n_2=0$, the image sensor to be made active is the slip image sensor 26, and if $n_2=1$, the image sensor to be made active is the card image sensor 44.

More specifically, if a change-active-scanner command configured to set the card image sensor 44 as the active scanner (that is, $n_2=1$) is received when in the slip image sensor standby state 230, the hybrid printer 10 changes state to the card image sensor standby state 240. Likewise, if a change-active-scanner command configured to set the slip image sensor 26 as the active scanner that is, $n_2=0$) is received when in the card image sensor standby state 240, the hybrid printer 10 changes state to the slip image sensor standby state 230.

As described above, this embodiment of the invention provides a change-configurable-scanner command for selecting the image sensor to be configured by changing the settings stored in memory, and a change-active-scanner command for selecting which image sensor to make active and use for scanning. Therefore, when a configuration command or process command is received after the image sensor to be configured or made active is selected, the selected image sensor can be reconfigured or driven to execute a scanning operation.

Returning to FIG. 7, the hybrid printer 10 has a roll paper printing controller 116 for controlling printing to roll paper P, and a slip printing controller 118 for controlling printing to slips, as the control units for controlling printing. The roll paper printing controller 116 and slip printing controller 118 control printing to slips S and roll paper P through roll paper transportation and printing mechanism drive circuit 62 and slip transportation and printing mechanism drive circuit 61, respectively.

Furthermore, the slip reader 120 and card reader 122 function as control units for controlling scanning operations, and more specifically image the inserted media by means of slip image sensor 26 and card image sensor 44, respectively, and temporarily store the imaged data to scanned image buffer 124 reserved in RAM 70.

The roll paper detection unit 125 detects the presence and position of roll paper P in roll paper transportation path 35 based on output from the roll paper detector 65.

The slip detection unit 126 likewise detects the presence and position of a slip S in the slip transportation path 21 based on output from slip detector 64.

The cover state detection unit 128 detects whether the front cover 12b and top cover 13a are open or closed based on output from the cover status detector 74. When the front cover 12b or top cover 13a is open, the cover state detection unit 128 outputs a cover-open signal to the off-line detection unit 130. When the off-line detection unit 130 receives this cover-open signal from the cover state detection unit 128, it unconditionally stops operation of the central control unit 110 and sets the hybrid printer 10 to an off-line state. When in this off-line state operations downstream of the command interpreter 106 stop, and any commands and print data received from the host computer 90 are simply buffered to the receive buffer 104 in the order received, and are not processed.

The card detection unit 133 detects the presence and position of a card C in the card image sensor 44 based on a detection signal from the card detector 66.

The status data generating unit 134 generates status data indicating the state of the hybrid printer 10 according to a command from the host computer 90. The status data generated by the status data generating unit 134 is sent through data transmission unit 138 to the host computer 90.

The image processing unit 136 applies an image process to the image data captured by the slip reader 120 or card reader 122 and temporarily stored in the scanned image buffer 124. Image processes applied by the image processing unit 136 include, for example, gray scale correction, image density processing, and image compression.

The image processing unit 136 also has a sharpening processor 136a for applying an image sharpening process to the image data. The sharpening processor 136a sharpens text recorded on the check, card, or other scanned medium so that the text can be read more easily from the image data. More specifically, the sharpening processor 136a processes the image according to a specific algorithm so that text areas stand out from other image areas. It should be noted that this sharpening processor 136a could apply an un-sharpening, noise reduction, or other image processing operation.

This image processing unit 136 operates according to the slip image sensor 26 or card image sensor 44 settings stored in the configuration parameter storage 114. More specifically, the configuration parameter storage 114 stores parameters indicating what type of image processing operation the image processing unit 136 should apply to the image data acquired from the slip image sensor 26 and card image sensor 44, and the sharpen process is run if these settings indicate that the sharpen process is to be applied. The image data specifically processed by the image processing unit 136 is then sent through the data transmission unit 138 to the host computer 90. Note that whether this sharpen process is to be applied can be controlled by the image sensor configuration command sent from the host computer 90.

Figure 10:
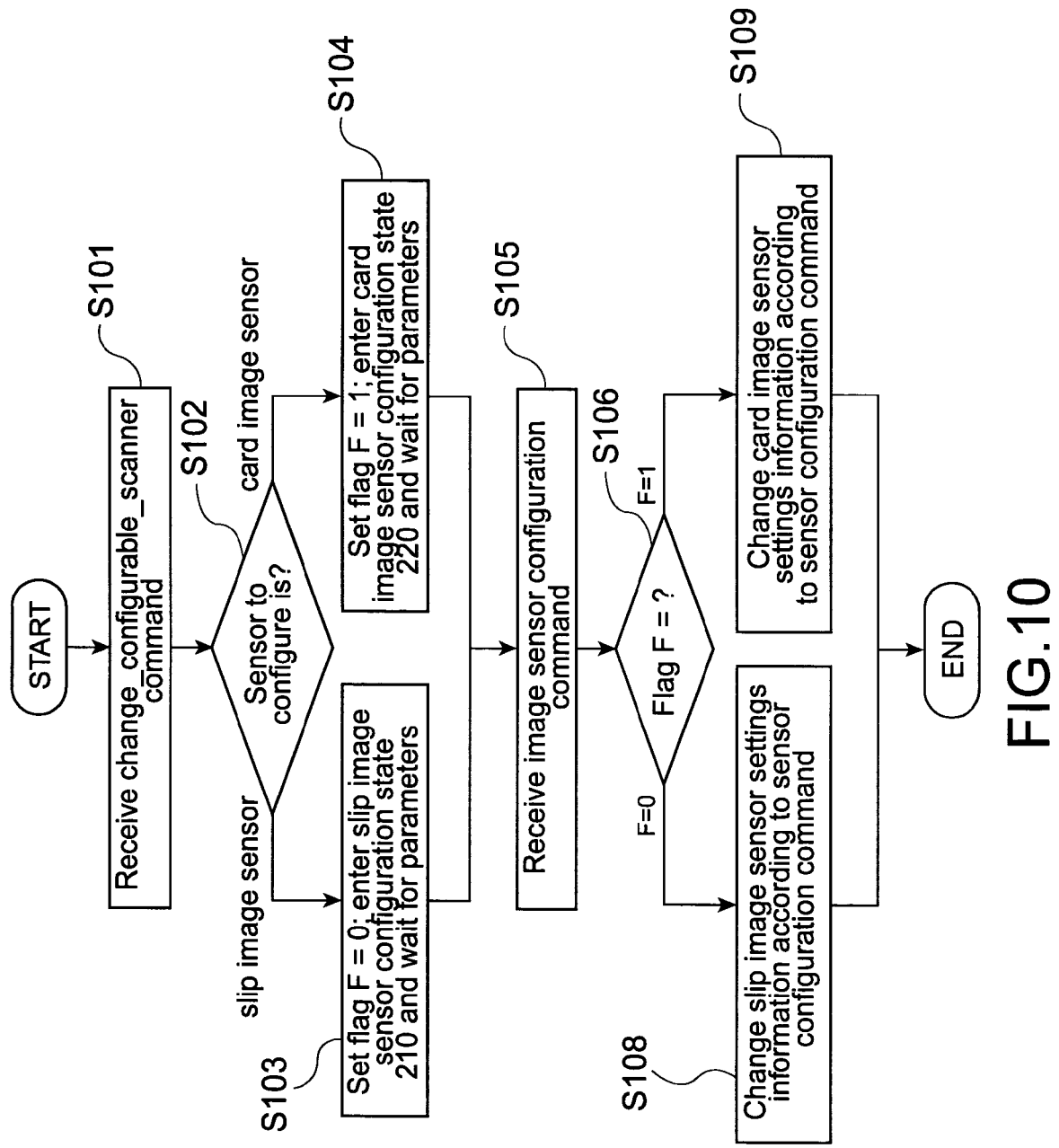
FIG. 10 is a flow chart of the sequence for rewriting the parameter settings of the slip image sensor and card image sensor.

The sequence for rewriting the configuration settings of the slip image sensor 26 and card image sensor 44 in a hybrid printer 10 according to this embodiment of the invention is described next with reference to the flow chart in FIG. 10.

When a change-configurable-scanner command is received from the host computer 90, the data receiving unit 102 temporarily stores the change-configurable-scanner command to receive buffer 104 (step S101). The command interpreter 106 then interprets the temporarily stored change-configurable-scanner command and detects whether the scanner to be configured is the slip image sensor 26 or card image sensor 44 (step S102). Based on the result from the command interpreter 106, the state memory 112 sets the image sensor specified in the change-configurable-scanner command as the configurable scanner, and stores the setting in state memory 112. More specifically, if the slip image sensor 26 is specified as the configurable scanner, flag F in state memory 112 is set to 0, and the slip image sensor configuration state 210 is assumed (step S103). However, if the card image sensor 44 is specified as the configurable scanner, flag F=1 is set in state memory 112, and the card image sensor configuration state 220 is assumed (step S104).

When the data receiving unit 102 then receives an image sensor configuration command from the host computer 90 (step S105), the command interpreter 106 interprets the content of the configuration command and passes the result to the central control unit 110. The central control unit 110 reads the flag F value in state memory 112 (step S106), and if flag F=0, moves to step S108. The central control unit 110 then changes the settings for slip image sensor 26 according to the configuration command (step S108), and operation then ends. However, if flag F=1, control goes to step S109, the central control unit 110 changes the settings for the card image sensor 44 according to the configuration command, and operation ends.

Figure 11:
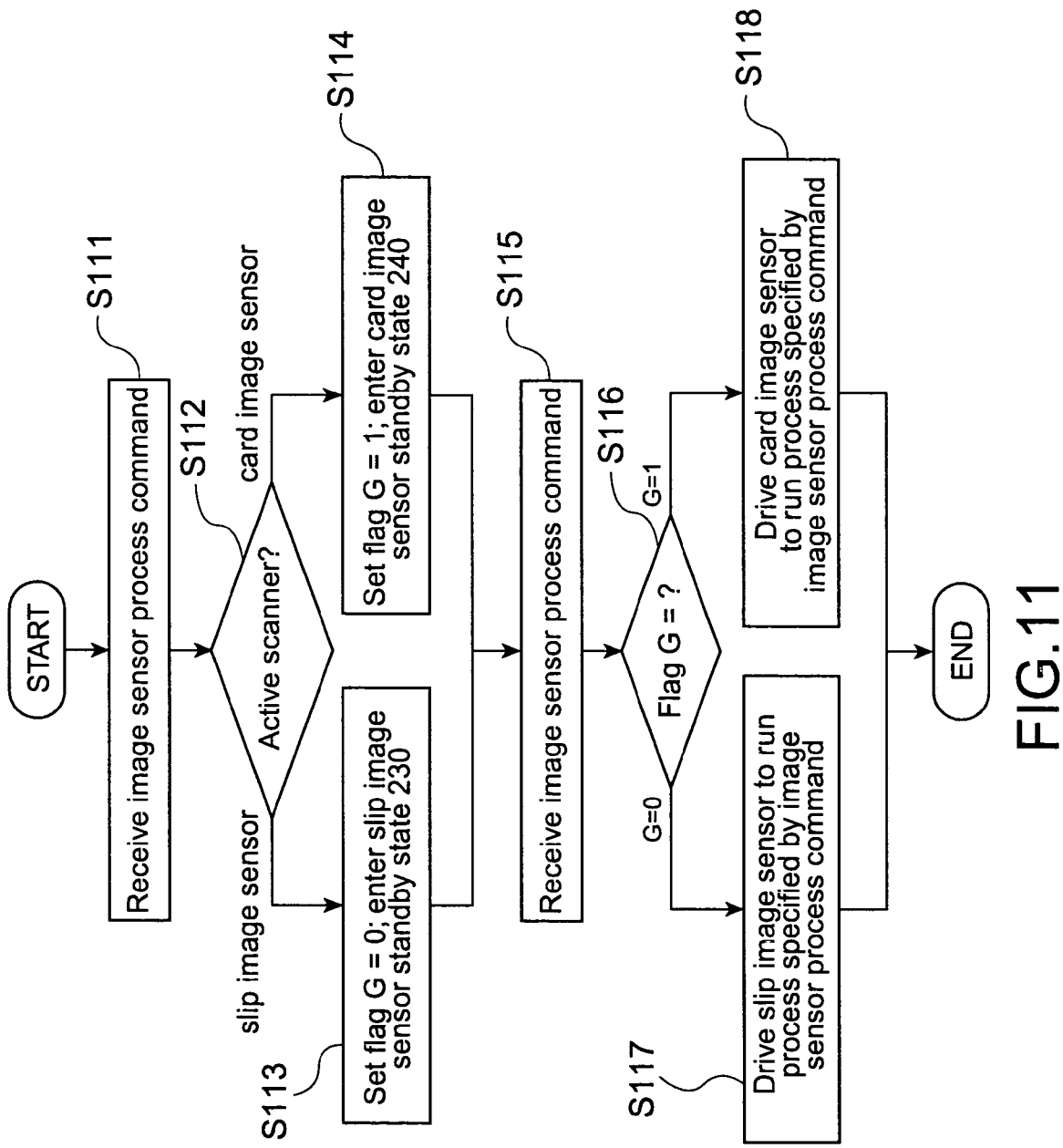
FIG. 11 is a flow chart of the operation processing sequence of the slip image sensor and card image sensor.
Figure 12:
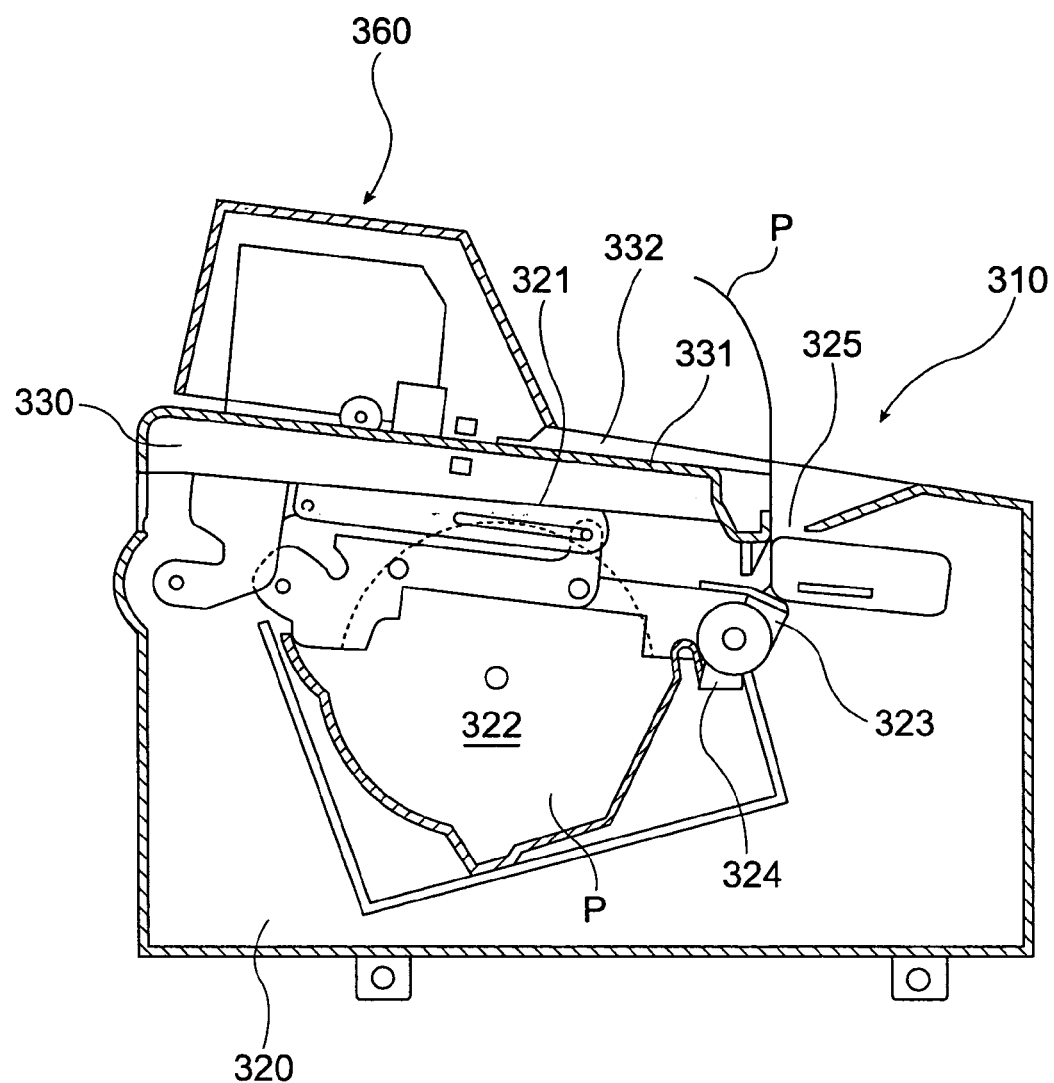
FIG. 12 is a section view of a hybrid printer according to the prior art.

Having described the process for rewriting the configuration settings of the slip and card image sensors 26 and 44 in a multiple-image-sensor-equipped printer 10 according to the present invention, operation of the sensors 26 and 44 according to the present invention is described next with reference to the flow chart in FIG. 11.

When the data receiving unit 102 receives an image sensor process command from the host computer 90, it buffers the command to receive buffer 104 (step S111). The command interpreter 106 then interprets the image sensor process command temporarily stored to receive buffer 104, and determines if slip image sensor 26 or card image sensor 44 is to be selected. Based on the result from the command interpreter 106, the central control unit 110 sets the scanner specified in the change-active-scanner command as the active scanner, and stores the setting in state memory 112 (step S112). More specifically, if the slip image sensor 26 is specified as the active scanner, flag G=0 is written to state memory 112, and the slip image sensor standby state 230 is assumed (step S113). On the other hand, if the card image sensor 44 is specified as the active scanner, flag G=1 is written to state memory 112, and the card image sensor standby state 240 is assumed (step S114).

When the data receiving unit 102 then receives another image sensor process command from the host computer 90 (step S115), the command interpreter 106 again interprets the command content and sends the result to the central control unit 110. The central control unit 110 then reads flag G from state memory 112 (step S116). If flag G=0, the central control unit 110 drives the slip image sensor 26 according to the image sensor process command (step S117), and operation then ends. However, if flag G=1, the central control unit 110 drives the card image sensor 44 according to the image sensor process command (step S118), and operation then ends.

The processing sequence of the slip image sensor 26 and card image sensor 44 in a hybrid printer 10 according to this embodiment of the invention is described above.

As described above, a hybrid printer 10 equipped with a slip image sensor 26 for imaging a slip S (first medium) conveyed through a slip transportation path 21 (first transportation path) to acquire an image of the slip S and a card image sensor 44 for imaging a card C (second medium) conveyed through a card transportation path 41 (second transportation path) to acquire an image of the card C can be configured to switch operation between the two image sensors quickly and efficiently.

Furthermore, a printer with image sensors 10 according to this embodiment of the invention also has configuration parameter storage 114 and a central control unit 110. The configuration parameter storage 114 is a configuration information storage medium for storing settings relating to the slip image sensor 26 (first settings information), and settings relating to the card image sensor 44 (second settings information). The central control unit 110 performs functions of a state selector for changing the sensor configuration state according to a change-configurable-scanner command sent from a host computer 90 to a slip image sensor configuration state 210 in which the first settings information stored to configuration parameter storage 114 can be changed (a first settings configuration state), or a card image sensor configuration state 220 in which the second settings information stored to configuration parameter storage 114 can be changed (a second settings configuration state). The selected image sensor configuration state is stored in state memory 112.

According to this embodiment of the present invention, the image sensor (scanner) to be configured is selected according to an externally supplied change-configurable-scanner command. More specifically, before an image sensor configuration process runs, the hybrid printer 10 can be set to a slip image sensor configuration state 210 (first settings configuration state), or a card image sensor configuration state 220 (second settings configuration state), and then enter a standby mode.

In this embodiment of the invention, the central control unit 110 performs functions of a settings information changing component or module, and is configured to change settings of the configuration state stored in the state memory 112 based on a configuration command sent from a host computer 90.

Therefore, if the host computer 90 first sends a change-configurable-scanner command specifying the scanner to be configured to the hybrid printer 10, the settings of the slip image sensor 26 or card image sensor 44 in the hybrid printer can be changed by sending a configuration command without specifying in the configuration command for which image sensor the settings are to be changed. Decision and processing operations in this hybrid printer 10 can therefore be minimized, and the processing demands on the hybrid printer 10 can be reduced. Processing time can also be shortened because it is not necessary to read the settings information and initialize the scanner each time the active scanner is changed.

Furthermore, this embodiment has a central control unit 110 as an active device selector for selecting and changing either the slip image sensor 26 or card image sensor 44 as the active image scanner to be driven according to a change-active-scanner command sent from the host computer 90.

Therefore, this embodiment of the invention can set the state of the hybrid printer 10 to either a slip image sensor standby state 230 or card image sensor standby state 240 for selecting the active image sensor according to a change-active-scanner command sent from an external host computer 90.

Furthermore, the central control unit 110 in this embodiment of the invention functions as a controller for controlling the active image scanner according to a process command sent from the host computer 90.

Therefore, if the host computer 90 first sends a change-active-scanner command specifying which image sensor to use to the hybrid printer 10, the selected sensor (slip image sensor 26 or card image sensor 44) can be operated to run a specific process by sending a scanning process command without specifying in the process command which image sensor to use. Decision and processing operations in this hybrid printer 10 can therefore be minimized, and the processing demands on the hybrid printer 10 can be reduced. Processing time can also be shortened because it is not necessary to read the settings information and initialize the scanner each time the active scanner is changed.

Furthermore, the settings that can be changed by the configuration command include image process selection information specifying what image process to run, and the image processing unit 136 runs the specific image process according to the image process selection information in the configuration command.

This image process selection information includes information for turning a sharpen process on or off.

This embodiment of the invention can thus use the configuration command to specify the image process applied to image data acquired by the slip image sensor 26 or card image sensor 44 according to the settings information. In particular, it is possible to specify whether or not to apply the sharpen process, which is a processor-intensive operation for the hybrid printer 10 to perform. Therefore, the sharpen process can be turned on to improve image reading accuracy as needed, or the sharpen process can be turned off for faster processing when it is only necessary to acquire an image as a record without strict requirements for the precision of the scanned image. Image processing can therefore be controlled according to the user's requirements.

The present invention has been described in the context of a printer having image sensors 10 by way of example, but the invention shall not be so limited. More specifically, this invention can be applied to any type of device that has two or more image sensors (scanners) and operates according to commands received from a host computer. While using the invention with an apparatus having a printer function is desirable, it is not necessary. The invention can also be applied to an apparatus that has two or more image sensors but does not have a printer function.

An image reader according to the present invention described above selects an active image sensor according to a change-active-scanner command sent from a host computer, and then drives the active image sensor to run a process according to an image sensor process command sent from the host computer. It is therefore possible to provide an image reading apparatus that can efficiently operate two image sensors, and to provide a control method for this image reading apparatus. As is apparent these settings of the active sensor can be stored in flash memory so that the settings can be automatically restored when the power turns on or the system resets.

Furthermore, when part of the transportation path is used for both the card transportation path and slip (check) transportation path, and the image sensor is located in this shared part of the transportation path for imaging both types of media, the operating mode can be switched between reading cards (first medium) and reading checks or slips (second medium) by means of a process command sent from the host computer.

While the present invention has been described in connection with the preferred embodiments thereof with reference to the accompanying drawings, various changes and modifications will be apparent to those skilled in the art in light of the foregoing. Thus, the invention described herein is intended to embrace all such changes and modifications as may fall within the spirit and scope of the appended claims.

What is claimed is:

1. An image reading apparatus, comprising:
a first image sensor configured to read a first medium conveyed through a first transportation path to acquire image data from the first medium;
a second image sensor configured to read a second medium conveyed through a second transportation path to acquire image data from the second medium; and
an active device selector configured to select, according to a change operation command sent from a host computer, either the first image sensor or second image sensor as the active image sensor to be driven.

2. The image reading apparatus as described in claim 1, further comprising a controller configured to control operation of the active image sensor according to a process command sent from a host computer.

3. The image reading apparatus as described in claim 1, further comprising:
   a settings information storage medium configured to store first settings information relating to the first image sensor and second settings information relating to the second image sensor; and
   a state selector configured to change a sensor configuration state, according to a change configurable sensor command sent from a host computer, to a first configuration state in which the first settings information can be changed, or to a second configuration state in which the second settings information can be changed.

4. The image reading apparatus as described in claim 3, further comprising a settings information configuration module configured to change the settings information corresponding to a current sensor configuration state according to a configuration command sent from the host computer.

5. An image reading apparatus comprising:
   an image sensor configured to read a first medium conveyed through a first transportation path to acquire image data from the first medium, and to read a second medium conveyed through a second transportation path to acquire image data from the second medium; and
   an active device selector configured to select, according to a change operation command sent from a host computer, either the first medium or second medium as the medium to be imaged.

6. A control method for an image reading apparatus, comprising:
   reading, with a first image sensor, a first medium conveyed through a first transportation path to acquire image data from the first medium;
   reading, with a second image sensor, a second medium conveyed through a second transportation path to acquire image data from the second medium;
   selecting, with an active device selector, according to a change operation command sent from a host computer, either the first image sensor or the second image sensor as the active image sensor to be driven;
   storing first settings information relating to the first image sensor and second settings information relating to the second image sensor; and
   changing a sensor configuration state, according to a change configurable sensor command sent from a host computer, to a first configuration state in which the first settings information can be changed, or to a second configuration state in which the second settings information can be changed.

* * * * *